March 23, 1937.                H. C. DRAKE                2,074,742
                    RAIL FLAW DETECTOR MECHANISM
                        Filed June 26, 1936

INVENTOR
Harcourt C. Drake
BY
Joseph H. Lipschutz
ATTORNEY

Patented Mar. 23, 1937

2,074,742

UNITED STATES PATENT OFFICE 2,074,742

RAIL FLAW DETECTOR MECHANISM

Harcourt C. Drake, Hempstead, N. Y., assignor to Sperry Products, Inc., Brooklyn, N. Y., a corporation of New York Application June 26, 1936, Serial No. 87,411

12 Claims. (Cl. 175—183)

This invention relates to rail fissure detector mechanism and is particularly adapted for use upon Sperry rail fissure detector cars. The principle of operation of these cars is well known and consists essentially in passing current through the rail as the car moves along the tracks in order to set up an electromagnetic field surrounding the rail, and exploring said field by flaw responsive mechanism which may take the form of induction coils. These coils will detect any distortion in the electromagnetic field due to the presence of flaws by generating an E. M. F. The generated E. M. F. is of relatively small magnitude and must be amplified before the impulse may be caused to operate an indicator, such as a recorder pen operating on a chart, and also marking means such as a paint gun for painting the rail in the region of flaw.

The amplifying means is preferably of the thermionic variety which for a given input will generate a predetermined amplified output. It will be understood, of course, that the sensitivity of the amplifier must be kept constant, otherwise for equal impulses which are put into the amplifier, variable outputs may be obtained and in certain instances the output may fall below the point necessary to operate the various indicating mechanisms, so that fissures will be missed. Therefore, it is the practice at present for the operators of the Sperry detector cars periodically to calibrate the amplifiers and this is done by stopping the car, disconnecting the detector coils from the amplifier, and connecting the amplifier to a calibrator which may take the form of a mechanism for generating a constant E. M. F. This periodic calibration necessitates stopping the car with consequent loss of time in operation.

It is the principal object of this invention to provide means whereby the amplifiers on a detector car may be periodically calibrated without interrupting the operation of the car. For this purpose I make use of the fact that whenever the detector mechanism passes over a rail joint the amplifiers are electrically disconnected from the detector mechanism for the interval necessary to permit the detector mechanism to pass over the rail joint. This joint-cutout mechanism, as it is termed, is employed because otherwise the various elements which comprise the rail joints, such as the angle bar, bolts, etc., which distort the electromagnetic field, would be picked up by the detector mechanism in the same manner as a flaw and would operate the indicating mechanism and the rail marking mechanism. Since such operation of the indicating and rail marking mechanisms is not desired, means are provided for preventing the flaw detector mechanism from impressing an impulse on the amplifiers for the interval during which the detector mechanism passes over the rail joint. I utilize this interval for the purpose of calibrating the amplifiers by causing a calibrator to impress a known E. M. F. on the amplifiers.

The detector mechanism of a Sperry rail flaw detector car comprises a plurality of sets of inductive coils and it is the practice to cause each set to be electrically connected to an individual amplifier and then to cause the outputs of the amplifiers to be combined for the purpose of operating the indicating mechanism. It is therefore a further object of my invention to provide means which will permit calibration of any of the amplifiers as desired during the interval that the pick-up coils are prevented from impressing impulses on the respective amplifiers.

Further objects and advantages of this invention will become apparent in the following detailed description thereof.

In the accompanying drawing.

Figure 1:
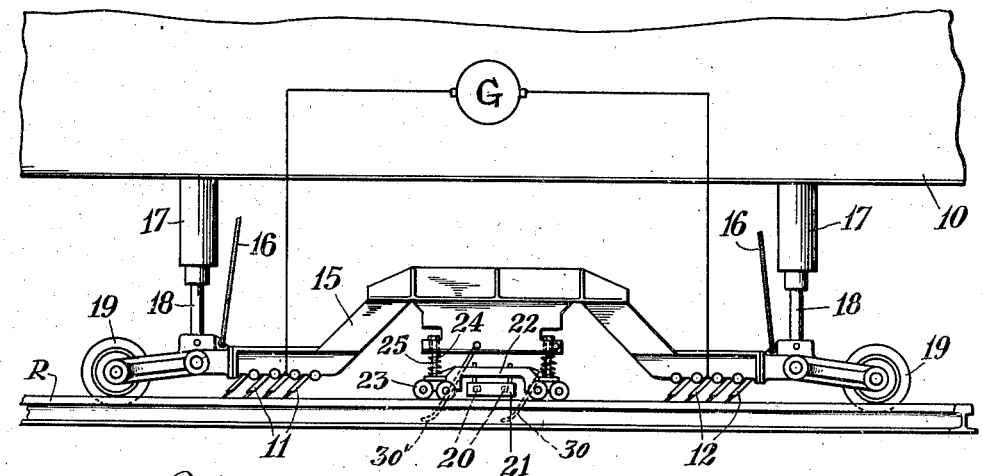
Fig. 1 is a side elevation of a portion of a Sperry rail fissure detector car to which my invention is applied.

Referring to Fig. 1 of the drawing, there is disclosed a portion of a standard Sperry rail flaw detector car having a body 10 adapted to ride along the rails R on the usual trucks, not shown, and having mounted therein a generator G for supplying current to a portion of the rail progressively as the car moves along the track. The current from generator G is passed through the rail R by means of sets of brushes 11 and 12 adapted to lead current into and out of the rail, said brushes being supported upon a main current brush carriage 15 which is normally held in elevated or inoperative position by means of springs, not shown, and cables 16. When it is desired to lower the said carriage to effective or operating position, with the current brushes in engagement with the rail, fluid pressure is supplied to cylinders 17 to depress piston rods 18, the said rods being connected at their lower ends to the carriage 15. The said carriage is lowered until it is supported upon the rail R by means such as flanged wheels 19. With the carriage in lowered position, current is supplied to the rail R between brushes 11 and 12 to set up an electromagnetic field surrounding the rail, which field will be uniform except in the region of flaw, where it will be distorted. Such distortions may be detected by means of one or more sets of inductive coils 20 which may be supported in a housing 21 maintained at a constant distance above the rail surface by mounting said housing on a detector carriage 22 adapted to ride upon the rail on means such as wheels 23. The said carriage 22 is supported on the current brush carriage 15 for movement independent thereof by means of loosely fitting bolts 24 and springs 25, so that the said carriage 22 may at all times maintain the axis of coils 20 at a fixed distance above the rail-head regardless of the surface irregularities in the rails. The coils 20 are connected in opposition so that variations in the source of current from the generator G, or vertical movement of the axis of the coils with respect to rail R, will affect said coils equally and oppositely so that these sources of error are eliminated. As the car moves along the rails, the coils 20 will normally cut the same number of lines of force, except on entering a region of flaw, whereupon first one and then the other of the coils will cut a different number of lines of force to generate a differential E. M. F. which after being adequately amplified may be caused to operate any suitable indicator such as a voltmeter or a pen P operating on a chart C.

Figure 2:
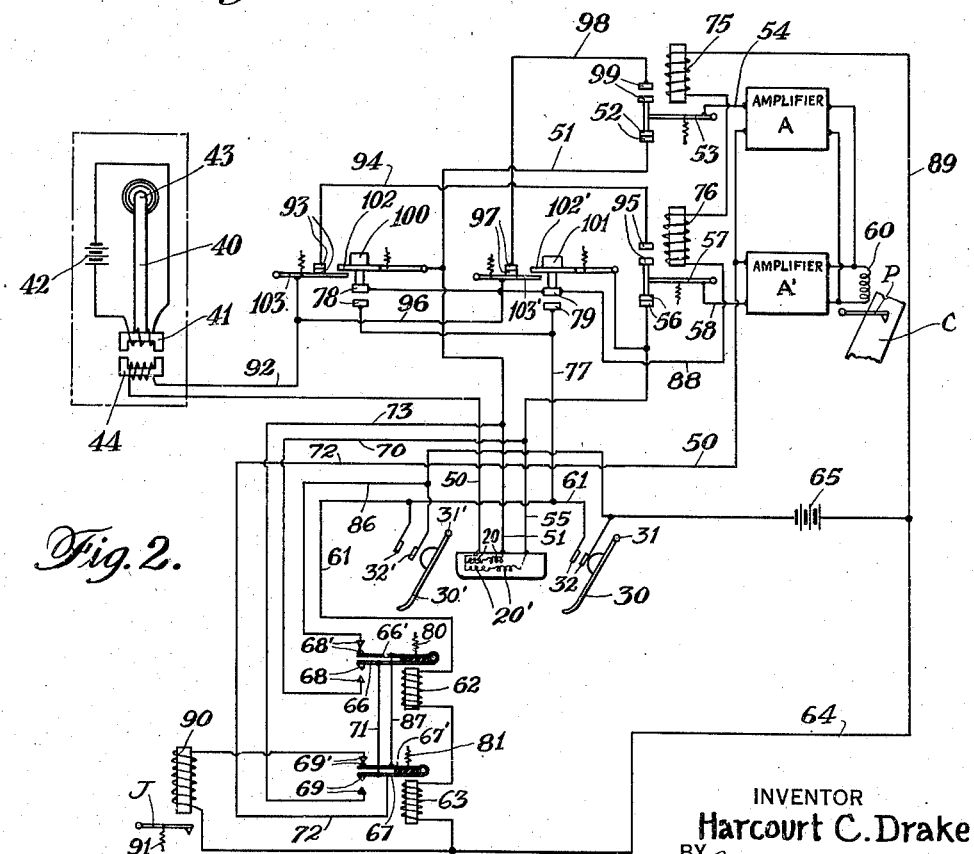
Fig. 2 is a wiring diagram illustrating the operation of my invention.

Referring to the diagram of Fig. 2, it will be seen that I have illustrated the invention in connection with two pairs of oppositely wound coils 20 and 20'. Said coils have a common lead 50 connected to each of two amplifiers A and A'; the other end of coils 20 extends by lead 51, a pair of contacts 52, armature 53, and lead 54 into amplifier A; and the other end of coils 20' extends by lead 55, contacts 56, armature 57, and lead 58 into amplifier A'. The outputs from said amplifiers are connected in parallel to operate the indicator, as, for instance, by energizing a magnet 60 which is designed to operate a pen P which normally traces a straight line on a moving chart C but which when attracted by the magnet 60 will produce a jog in the line to indicate the presence of a flaw. At the same time that magnet 60 is energized to operate the pen P on the chart C, there may be energized another magnet for operating a paint gun to produce a mark on the rail, as disclosed in my Patent No. 1,912,569 granted June 6, 1933.

As stated hereinbefore, it is desirable to prevent actuation of the pen P and the rail marking means when the coils 20 and 20' pass over the rail joint since such joint causes distortion of the electromagnetic field and would produce energization of the magnet 60 and the paint magnet. For this purpose there are provided a pair of joint fingers 30 and 30' pivoted at 31 and 31' on the carriage 15 and adapted to engage the gage side of the rail. As the car moves along the rail, first finger 30 and then finger 30' will engage the angle bar which at a rail joint extends outside of the gage and will cause said fingers to swing around their pivots and close sets of contacts 32, 32' connected in parallel in circuits which include lead 61, magnets 62 and 63, lead 64, and battery 65. On energizing the magnets 62 and 63 they attract their armatures 66 and 67 to close sets of contacts 68 and 69 which establish short-circuits between coils 20 and 20' and their respective amplifiers. Thus the closure of contacts 68 establishes a circuit consisting of coils 20', lead 55, lead 70, the contacts 68, lead 71, lead 72, and common lead 50. It will thus be seen that a circuit is established between lead 50 and lead 55 around coils 20' which short-circuit the amplifier A' into which said coils normally operate. Similarly, the closure of contacts 69 establishes a circuit from coils 20 through lead 51, lead 73, the contacts 69, and lead 72 to the common lead 50. It will thus be seen that a circuit is established between leads 50 and 51 connecting the ends of coils 20 which short-circuits the amplifier A into which the said coils 20 normally operate. By their short-circuiting amplifiers A and A' they are rendered ineffective to amplify the impulses which may be generated by the pairs of coils 20 and 20' operating from a rail joint. It will be understood that the fingers 30 and 30' are so positioned that finger 30' engages the angle-bar of the rail joint just before finger 30 leaves the same, and the said fingers 30 and 30' are so positioned as to keep the amplifiers A and A' short-circuited throughout the interval that the coils 20 and 20' are passing over the angle-bar.

The armatures 66 and 67 form the lower parts of double armature members, the upper parts of which, 66' and 67', are normally operated by means of springs 80 and 81 to maintain upper sets of contacts 68' and 69' closed. The closure of contacts 68' and 69' serves to maintain a normally closed circuit consisting of the battery 65, lead 85, lead 86, contacts 68', lead 87, contacts 69', magnet 90, and return lead 64. The magnet 90 normally attracts a pen J which may operate on the same chart C as the pen P, to draw a straight line as the chart moves beneath it, but when magnets 62 and 63 are energized to draw their armatures downwardly, contacts 68' and 69' are broken to break the circuit through magnet 90 and permit spring 91 to operate armature J and produce a deflection in the line to indicate the presence of a joint. The said deflection will continue as long as the fingers 30 and 30' ride on the angle-bars to maintain the circuit through magnets 62 and 63 closed. When the angle-bar has been passed the springs 80 and 81 again close contacts 68' and 69' to energize magnet 90 to cause it to attract its armature J to its original position.

From the above description it will now become apparent that there is an interval represented by the time during which the fingers 30 and 30' are riding on the angle-bar of the rail joint, during which the detector coils 20 and 20' are prevented from impressing any impulses on their amplifiers A and A' because the said amplifiers are short-circuited. I utilize these intervals for the purpose of calibrating the said amplifiers. For calibration purposes there is employed any suitable mechanism for generating impulses of constant E. M. F. so that the input into the amplifier is known and the output therefore gives an indication of the sensitivity of the said amplifier. For this purpose I may utilize any known mechanism for generating a constant E. M. F. such as, for instance, the pendulum 40 which carries an electromagnet 41 at its lower end energized from means such as battery 42, the said pendulum 40 being adapted to swing on its pivot 43 to cause the said magnet 41 periodically to sweep past a fixed inductive pick-up 44 to generate a predetermined E. M. F.

By my invention I am enabled to impress the said known E. M. F. on either amplifier A or amplifier A' selectively, as desired, by the following mechanism: The circuit from the inductive pick-up 44 may comprise the lead 92, contacts 93, lead 94, contacts 95, lead 58 to amplifier A', and return lead 50. A second circuit from said inductive pick-up 44 comprises the lead 92, lead 96, contacts 97, lead 98, contacts 99, lead 54 to amplifier A, and return lead 50. It will now be seen that two circuits are established from the calibrator to the amplifiers A and A' respectively, and that these circuits are normally open by reason of the open sets of contacts 95 and 99. Said contacts are adapted to be closed when the joint fingers 30 and 30' are in engagement with the angle-bar of the rail joint. Such closure is rendered possible by magnets 75 and 76, which become energized when contacts 32 or 32' are closed in a circuit including battery 65, sets of contacts 32 or 32', lead 77 sets of contacts 78 or 79, lead 88 to the magnets 76 and 75, and return lead 89 to battery 65.

It will thus be seen that the closure of contacts 32 or 32' does not energize magnets 75 and 76 to cause closure of contacts 99 and 95, by reason of the fact that the circuit through said magnets 75 and 76 contains the open contacts 78 and 79. These contacts are designed to be selectively controlled by an operator so that when he closes contacts 78 or 79 the magnets 75 and 76 will be energized to close contacts 99 and 95, respectively. Such closure may be effected by the operator by depressing button 100 or 101 to close contacts 78 or 79 respectively. Closure of either of the last-named contacts will energize magnets 75 and 76 to close contacts 99 and 95. This would normally close the circuit from inductive pick-up 44 to both amplifiers A and A' to impress the predetermined constant voltage on both amplifiers simultaneously. This is not desired since it is the object to calibrate each amplifier separately. Therefore means are provided whereby upon depressing button 100 the circuit from the inductive pick-up to one of the amplifiers is opened while the other remains closed, whereas, when the other button is depressed the circuit to the first amplifier is closed and that to the second amplifier opened. Thus, for instance, on depressing button 100, contacts 93 are opened by reason of flange 102 on said button engaging the armature 103 carrying one of said contacts 93. The contacts 93 being opened, the circuit from the inductive pick-up 44 to amplifier A' is broken. The circuit from said calibrator to amplifier A, however, is closed by reason of the fact that contacts 78 are closed, and the circuit then extends from inductive pick-up 44 by way of lead 92, lead 96, contacts 97, lead 98, contacts 99, armature 53, and lead 54 into amplifier A. Thus, by merely swinging pendulum 40 and depressing button 100 and holding it there as the car moves along the rails, periodic impulses of predetermined size are impressed upon amplifier A throughout the interval that fingers 30 and 30' engage the angle-bar of the rail joint, and by indicating the output of the amplifier its sensitivity may be determined.

Similarly, by depressing button 101 it will be seen that the circuit from the inductive pick-up 44 to amplifier A is interrupted by reason of flange 102' on said button engaging armature 103' carrying the lowermost of the contacts 97. Contacts 79, however, are closed and thus the circuit from the calibrator extends from lead 92, contacts 93, lead 94, contacts 95, armature 57, and lead 58 into the amplifier A'. As long, therefore, as the button 101 is kept pressed down, and pendulum 40 continues to swing, periodic impulses of predetermined magnitude will be impressed upon amplifier A' throughout the period that fingers 30 and 30' are in engagement with an angle bar of a rail joint.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a rail flaw detector mechanism, means adapted to generate impulses in response to flaws, an amplifier for amplifying said impulses, indicating means actuated by said amplified impulses, means for preventing impulses generated by said responsive means from being impressed on said amplifier while said responsive means is passing over rail joints, means for generating an impulse of predetermined magnitude, and means whereby said last-named impulse is impressed on said amplifier while said responsive means is passing over rail joints.

2. In a rail flaw detector mechanism, means adapted to generate impulses in response to flaws, an amplifier for amplifying said impulses, indicating means actuated by said amplified impulses, means for preventing impulses generated by said responsive means from being impressed on said amplifier while said responsive means is passing over rail joints, means for generating an impulse of predetermined magnitude, and means controlled by an operator whereby said last named impulse is impressed on said amplifier while said responsive means is passing over rail joints.

3. In a rail flaw detector mechanism, means adapted to generate impulses in response to flaws, an amplifier for amplifying said impulses, indicating means actuated by said amplified impulses, means for preventing impulses generated by said responsive means from being impressed on said amplifier while said responsive means is passing over rail joints, means for generating an impulse of predetermined magnitude, and means controlled jointly by an operator and said preventing means whereby said last-named impulse is impressed on said amplifier while said responsive means is passing over rail joints.

4. In a rail flaw detector mechanism, means adapted to generate impulses in response to flaws, a plurality of amplifiers for amplifying said impulses, indicating means actuated by said amplified impulses, means for preventing impulses generated by said responsive means from being impressed on said amplifiers while said responsive means is passing over rail joints, means for generating an impulse of predetermined magnitude, and means whereby said last-named impulse is selectively impressed on said amplifiers while said responsive means is passing over rail joints.

5. In a rail flaw detector mechanism, means adapted to generate impulses in response to flaws, a plurality of amplifiers for amplifying said impulses, indicating means actuated by said amplified impulses, means for preventing impulses generated by said responsive means from being impressed on said amplifiers while said responsive means is passing over rail joints, means for generating an impulse of predetermined magnitude, and means controlled by an operator whereby said last-named impulse is selectively impressed on said amplifiers while said responsive means is passing over rail joints.

6. In a rail flaw detector mechanism, means adapted to generate impulses in response to flaws, a plurality of amplifiers for amplifying said impulses, indicating means actuated by said amplified impulses, means for preventing impulses generated by said responsive means from being impressed on said amplifiers while said responsive means is passing over rail joints, means for generating an impulse of predetermined magnitude, and means controlled jointly by an operator and said preventing means whereby said last-named impulse is selectively impressed on said amplifiers while said responsive means is passing over rail joints.

7. In a rail flaw detector mechanism, means adapted to generate impulses in response to flaws, an amplifier for amplifying said impulses, indicating means actuated by said amplified impulses, means for preventing impulses generated by said responsive means from being impressed on said amplifier while said responsive means is passing over rail joints, means for generating a plurality of impulses of predetermined magnitude, and means whereby said last-named impulses are impressed on said amplifier while said responsive means is passing over rail joints.

8. In a rail flaw detector mechanism, means adapted to generate impulses in response to flaws, a plurality of amplifiers for amplifying said impulses, indicating means actuated by said amplified impulses, means for preventing impulses generated by said responsive means from being impressed on said amplifiers while said responsive means is passing over rail joints, means for generating a plurality of impulses of predetermined magnitude, and means whereby said last-named impulses are impressed on said amplifiers while said responsive means is passing over rail joints.

9. The method of testing rails in track which consists in passing a flaw responsive mechanism over the rails to generate impulses in the region of flaw, amplifying said impulses by an amplifier, preventing impulses generated by said mechanism from being impressed on the amplifier while said mechanism is passing over a rail joint, generating an impulse of predetermined magnitude, and impressing said last-named impulse on the amplifier while said mechanism is passing over rail joints.

10. The method of testing rails in track which consists in passing a flaw responsive mechanism over the rails to generate impulses in the region of flaw, amplifying said impulses by an amplifier, preventing impulses generated by said mechanism from being impressed on the amplifier while said mechanism is passing over a rail joint, generating a plurality of impulses of predetermined magnitude and impressing said last-named impulses on the amplifier while said mechanism is passing over rail joints.

11. The method of testing rails in track which consists in passing a flaw responsive mechanism over the rails to generate impulses in the region of flaw, amplifying said impulses by a plurality of amplifiers, preventing impulses generated by said mechanism from being impressed on the amplifiers while said mechanism is passing over a rail joint, generating an impulse of predetermined magnitude, and impressing said last-named impulse on the amplifiers while said mechanism is passing over rail joints.

12. The method of testing rails in track which consists in passing a flaw responsive mechanism over the rails to generate impulses in the region of flaw, amplifying said impulses by a plurality of amplifiers, preventing impulses generated by said mechanism from being impressed on the amplifiers while said mechanism is passing over a rail joint, generating a plurality of impulses of predetermined magnitude, and impressing said last-named impulses on the amplifiers while said mechanism is passing over rail joints.

HARCOURT C. DRAKE.